United States Patent
Sinha et al.

(10) Patent No.: US 7,516,015 B2
(45) Date of Patent: Apr. 7, 2009

(54) SYSTEM AND METHOD FOR DETECTION OF NEAR-WELLBORE ALTERATION USING ACOUSTIC DATA

(75) Inventors: Bikash K. Sinha, West Redding, CT (US); Peter T. Wu, Sugar Land, TX (US); James G. L. Thompson, Perth (AU)

(73) Assignee: Schlumberger Technology Corporation, Sugarland, TX (US)

(*) Notice: Subject to any disclaimer, the term of this patent is extended or adjusted under 35 U.S.C. 154(b) by 0 days.

(21) Appl. No.: 11/308,083

(22) Filed: Mar. 6, 2006

(65) Prior Publication Data
US 2006/0235617 A1 Oct. 19, 2006

Related U.S. Application Data

(60) Provisional application No. 60/594,358, filed on Mar. 31, 2005.

(51) Int. Cl.
*G01V 1/40* (2006.01)
(52) U.S. Cl. .......................................... 702/6
(58) Field of Classification Search ............... 702/6
See application file for complete search history.

(56) References Cited

U.S. PATENT DOCUMENTS

| | | | |
|---|---|---|---|
| 4,594,691 A | 6/1986 | Kimball et al. | |
| 4,698,792 A | 10/1987 | Kurkjian et al. | |
| 4,698,793 A | 10/1987 | Wu | |
| 4,703,460 A | 10/1987 | Kurkjian et al. | |
| 4,932,003 A | 6/1990 | Winbow et al. | |
| 5,027,331 A | 6/1991 | Winbow et al. | |
| 5,077,697 A * | 12/1991 | Chang | 367/31 |
| 5,278,805 A | 1/1994 | Kimball | |
| 5,381,092 A | 1/1995 | Freedman | |
| 5,521,882 A * | 5/1996 | D'Angelo et al. | 367/32 |
| 5,594,706 A * | 1/1997 | Shenoy et al. | 367/76 |
| 5,687,138 A | 11/1997 | Kimball et al. | |
| 5,740,124 A | 4/1998 | Chunduru et al. | |
| 5,999,484 A | 12/1999 | Kimball et al. | |
| 6,084,826 A | 7/2000 | Leggett, III | |
| 6,176,323 B1 | 1/2001 | Weirich et al. | |
| 6,427,124 B1 | 7/2002 | Dubinsky et al. | |
| 6,449,560 B1 | 9/2002 | Kimball | |
| 6,581,010 B2 | 6/2003 | Dubinsky et al. | |
| 6,611,761 B2 | 8/2003 | Sinha et al. | |
| 6,631,327 B2 | 10/2003 | Hsu et al. | |
| 6,691,036 B2 * | 2/2004 | Blanch et al. | 702/11 |

(Continued)

FOREIGN PATENT DOCUMENTS

EP 1324076 A2 7/2003

*Primary Examiner*—Michael P. Nghiem
*Assistant Examiner*—Cindy H Khuu
(74) *Attorney, Agent, or Firm*—Matthias Abrell; Jaime Castano; Dale Gaudier (57) ABSTRACT

A method for monitoring a formation property includes determining at least two slowness values from at least two datasets each characterizing an acoustic wave having a different frequency traversing a formation; and deriving an indicator based on the at least two slowness values. A system for monitoring a formation property includes a process and a memory, wherein the memory stores a program having instructions for: determining at least two slowness values from at least two datasets each characterizing an acoustic wave having a different frequency traversing a formation; and deriving an indicator based on the at least two slowness values.

18 Claims, 10 Drawing Sheets

U.S. PATENT DOCUMENTS

| | | |
|---|---|---|
| 6,714,480 B2 | 3/2004 | Sinha et al. |
| 6,904,365 B2 | 6/2005 | Bratton et al. |
| 6,943,709 B2 * | 9/2005 | Blanch et al. ............ 341/76 |
| 7,120,541 B2 * | 10/2006 | Wang ..................... 702/11 |
| 2004/0001389 A1 * | 1/2004 | Tang ...................... 367/31 |
| 2004/0001398 A1 | 1/2004 | Tang |
| 2004/0006428 A1 | 1/2004 | Hsu et al. |
| 2004/0122595 A1 | 6/2004 | Valero |
| 2004/0145503 A1 | 7/2004 | Blanch et al. |
| 2004/0158404 A1 | 8/2004 | Gaston et al. |
| 2004/0176911 A1 | 9/2004 | Bratton et al. |
| 2004/0199331 A1 | 10/2004 | Mandal |
| 2005/0190651 A1 * | 9/2005 | Plona et al. ............... 367/68 |
| 2006/0039238 A1 * | 2/2006 | Mandal et al. ............. 367/31 |

\* cited by examiner

SYSTEM AND METHOD FOR DETECTION OF NEAR-WELLBORE ALTERATION USING ACOUSTIC DATA

CROSS-REFERENCE TO RELATED APPLICATIONS

This claims priority of U.S. Provisional Application Ser. No. 60/594,358, filed on Mar. 31, 2005. This provisional application is incorporated by reference in its entirety. This application is related to a co-pending U.S. Patent Application, entitled "Pump-Off Measurements for Quality Control and Wellbore Stability Prediction," which is assigned to the present assignee and is incorporated by reference in its entirety.

BACKGROUND OF INVENTION

1. Field of the Invention

The present invention relates generally to methods of acoustic measurement and determination of subsurface parameters in a wellbore and its surrounding formation.

2. Background Art

The oil and gas industry uses various tools to probe the formation penetrated by a borehole in order to locate hydrocarbon reservoirs and to determine the types and quantities of hydrocarbons. Among these tools, sonic tools have been found to provide valuable information regarding formation properties. In sonic or acoustic logging, a tool is typically lowered into a borehole, either after the well has been drilled or while the well is being drilled, and sonic energy is transmitted from a source into the borehole and surrounding formation. The sonic waves that travel through the borehole and formations are then detected with one or more receivers. Conventional sonic tools for this purpose are described in U.S. Pat. Nos. 5,852,587, 4,543,648, 5,510,582, 4,594,691, 5,594,706, 6,082,484, 6,631,327, 6,474,439, 6,494,288, 5,796,677, 5,309,404, 5,521,882, 5,753,812, RE34,975 and 6,466,513.

Acoustic waves are periodic vibrational disturbances resulting from acoustic energy that propagates through a medium, such as a subsurface formation. Acoustic waves are typically characterized in terms of their frequency $f=V/\lambda$ (V is the speed of sound, $\lambda$ is the wavelength), amplitude, and speed of propagation (Velocity, V).

An acoustic source in a fluid-filled borehole generates headwaves as well as relatively stronger borehole-guided modes. A standard sonic measurement system consists of placing source and receivers inside a fluid-filled borehole. The source is configured in the form of either a monopole, or a dipole, or a quadrupole source. The source bandwidth typically ranges from a 0.5 to 20 kHz. A monopole source generates primarily the lowest-order axisymmetric mode, also referred to as the Stoneley mode, together with compressional and shear headwaves. In contrast, a dipole source primarily excites the lowest-order flexural borehole mode together with compressional and shear headwaves. A quadrupole source primarily excites the lowest order quadrupole mode together with compressional and shear headwaves.

Figure 1:
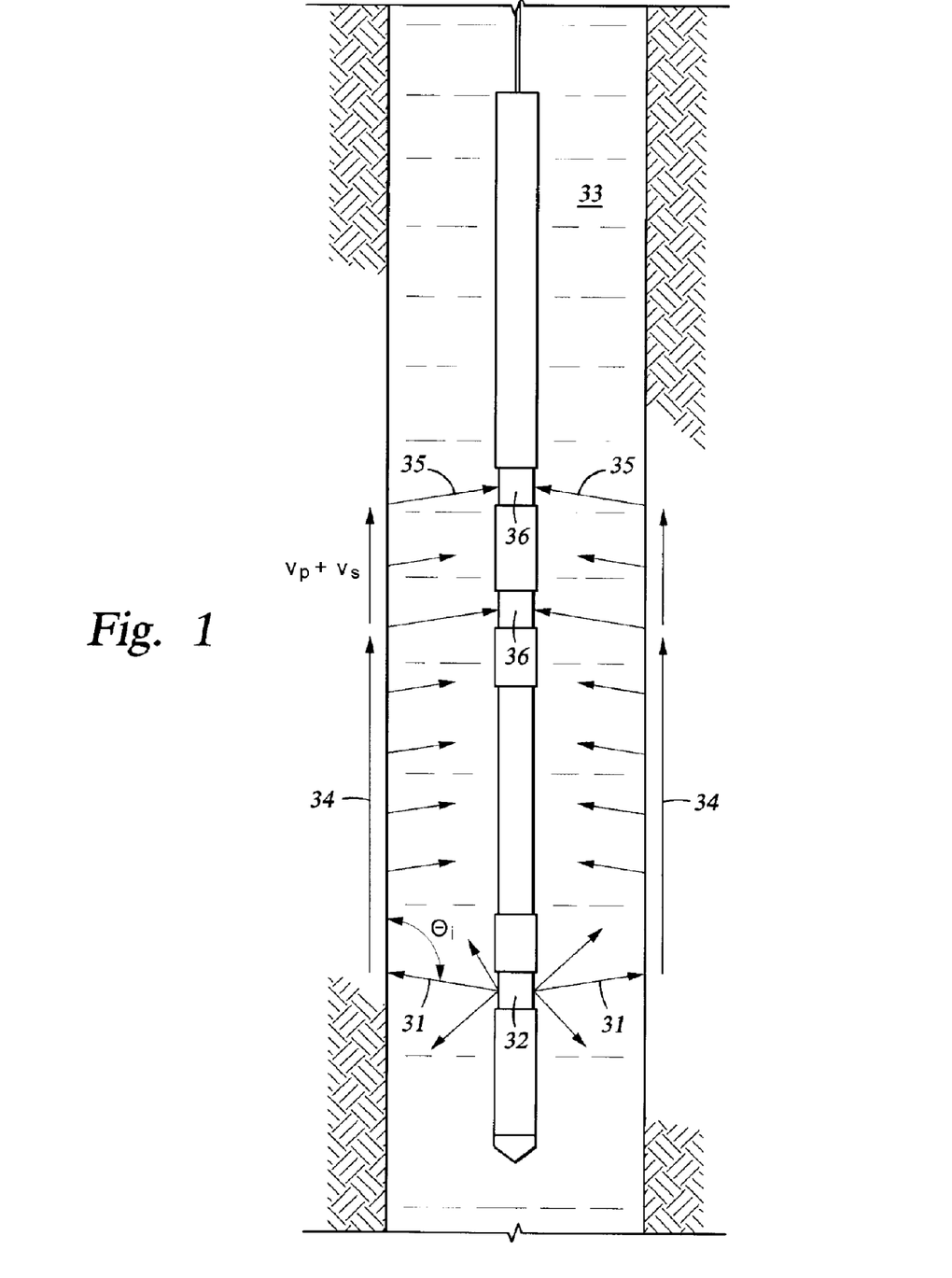
FIG. 1 shows a conventional acoustic tool equipped with a monopole source and receiver disposed in a borehole.

With reference to FIG. 1, a pulse 1 from a monopole source 32 travels through the fluid in the wellbore 33 at a speed $V_f$. This wave is a (fluid) compressional wave or P-wave. Some of the P-waves encounter the wellbore wall at a critical angle, $\leq \theta_i$, that allows the wave to transmit into the formation and to refract as pulse 34 along the longitudinal wellbore axis. The critical incidence angle of the fluid compressional wave is $\theta_i = \sin^{-1}(V_f/V_p)$. There are two wave types that propagate along the axis through the surrounding formation, P-waves (with velocity $V_p$) and shear waves or S-waves (with velocity $V_s$). As the compressional and shear waves travel along the interface, it radiates waves 35 (S-waves being converted back to P-waves) back into the fluid that can be detected by the receiver array 36.

In fast formations ($V_s > V_f$), the shear headwave can be similarly excited by a fluid compressional wave at the critical incidence angle $\theta_i = \sin^{-1}(V_f/V_s)$. In a homogeneous and isotropic model of fast formations, compressional and shear headwaves can be generated by a monopole source placed in a fluid-filled borehole for determining the formation compressional ($V_p$) and shear wave ($V_s$) speeds. While FIG. 1 shows only two receivers it is understood by those skilled in the art that there may be more than two receivers. Any initial P-wave from the transmitter that has an incidence angle relative to the wellbore wall greater than the angle required for penetration is reflected, and the wellbore wall acts as a wave guide. Waves that travel along the interface of the drilling fluid and the borehole wall are referred to as Stoneley waves with a velocity $V_{st}$.

It is well known that refracted shear headwaves are not detectable in slow formations (where the shear wave velocity $V_s$ is less than the borehole-fluid compressional velocity $V_f$) with receivers placed in the borehole fluid. In slow formations, formation shear velocities are generally obtained either from the low-frequency asymptote of flexural dispersion (using dipole transmitters) or through inversion of the quadrupole mode signals. There are standard processing techniques for the estimation of formation shear velocities in either fast or slow formations from an array of recorded dipole or quadrupole waveforms.

Acoustic properties of interest for formations may include compressional wave speed in the formation ($V_p$), shear wave speed ($V_s$), Stoneley or borehole modes, and formation compressional slowness ($1/V_p$). Additionally, acoustic images may be used to depict borehole wall conditions and other geological features away from the borehole. These acoustic measurements have applications in seismic correlation, petrophysics, rock mechanics and other areas.

Recordings of acoustic properties as functions of depth are known as acoustic logs. Information obtained from acoustic logs may be useful in a variety of applications, including well to well correlation, porosity determination, determination of mechanical or elastic rock parameters to give an indication of lithology, detection of over-pressured formation zones, and the conversion of seismic time traces to depth traces based on the measured speed of sound in the formation. As an example, the permeability of the formation around the wellbore can be extracted by analysis of the Stoneley wave characteristics, in particular the amplitude of the Stoneley waves.

A typical sonic log (a type of acoustic log) can be recorded on a linear scale of compressional slowness ($1/V_p$) versus depth in the borehole, and is typically accompanied by an integrated-travel-time log in which each division indicates an increase of one microsecond of the total travel time period.

Various analysis methods are available for deriving formation properties from the sonic log data. Among these, the slowness-time-coherence (STC) method is commonly used to process the monopole sonic signals for coherent arrivals, including the formation compressional, shear, and borehole Stoneley waves. See U.S. Pat. No. 4,594,691, which is incorporated by reference in its entirety, and Kimball et al., Geophysics, Vol. 49 (1984), pp. 264-281.

An example of a logging device that has been used to obtain and analyze sonic logging measurements of formations surrounding a borehole is called the Dipole Shear Sonic Imager (DSI™), and is of the general type described in Harrison et al., "Acquisition and Analysis of Sonic Waveforms From a Borehole Monopole And Dipole Source For The Determination Of Compressional And Shear Speeds And Their Relation To Rock Mechanical Properties And Surface Seismic Data," Society of Petroleum Engineers, SPE 20557, 1990. In conventional use of the DSI™ logging tool, one can present compressional slowness $\Delta tc$ ($1/V_p$), shear slowness, $\Delta ts$ ($1/V_s$), and Stoneley slowness, $\Delta tst$ ($1/V_{st}$), each as a function of depth, z. The Stoneley slowness is estimated from the STC algorithm using a bandpass filtered (0.5 to 1.5 kHz) Stoneley waveforms.

Shear moduli are constants derived from the ratio of stress to strain in a formation. These constants relate the force exerted on a formation (stress) to the degree of permanent deformity (strain) caused by this force, and can be used as a measure of elasticity of the formation. U.S. Pat. No. 6,611,761 describes a technique for obtaining radial profiles of fast and slow shear slownesses using the measured dipole dispersions in the two orthogonal directions that are characterized by the shear moduli c44 and c55 for a borehole parallel to the X3-axis in an orthorhombic formation. U.S. Pat. No. 6,714,480 describes a technique for estimating the horizontal shear modulus c66 of an orthorhombic or TI-formation using the zero frequency intercept of the Stoneley dispersion that yields the tube wave velocity ($V_{st}$).

During a drilling operation, the drilling action and pumping of the fluids may damage the formation or introduce stress in the formation in the near wellbore region. Mechanical damage or stress near the wellbore may present trouble to a driller, such as causing tools to stick or slip. Thus, it is desirable to have a qualitative detection of near-wellbore alterations using measurements while drilling to provide real-time input to the wellbore stability model and to help identify problem zones ahead of time so that the driller can deal with issues before they become costly. Although sonic or acoustic measurements can provide information about formation mechanics and stress, such conventional measurements are susceptible to variations in borehole-formation parameters. Therefore, a need remains for methods that can provide qualitative detection of near-wellbore alterations with less sensitivity to variations in borehole-formation parameters.

SUMMARY OF INVENTION

In one aspect, embodiments disclosed herein of the invention relate to methods for monitoring a formation property. A method in accordance with one embodiment of the invention includes determining at least two slowness values from at least two datasets each characterizing an acoustic wave having a different frequency traversing a formation; and deriving an indicator based on the at least two slowness values.

In another aspect, embodiments of the invention relate to systems for monitoring a formation property. A system in accordance with one embodiment of the invention includes a process and a memory, wherein the memory stores a program having instructions for: determining at least two slowness values from at least two datasets each characterizing an acoustic wave having a different frequency traversing a formation; and deriving an indicator based on the at least two slowness values.

Other aspects and advantages of the invention will become apparent from the following description and attached claims.

DETAILED DESCRIPTION

Embodiments of the invention relate to systems and methods for providing qualitative indicators about a formation property, particularly near a wellbore. The indicator may be used to monitor or detect alterations near a wellbore due to, for example, mechanical damages or formation stress. Embodiments of the invention can be used in drilling operations to provide drillers with real time information about near wellbore property alterations so that proper measurements may be taken to avoid incipient borehole failure.

Embodiments of the invention are based on acoustic measurements obtained with two or more frequencies. These acoustic measurements are analyzed for frequency-dependent properties that correlate with formation property changes. Some embodiments of the invention rely on Stoneley slowness determinations. Inventors of the present invention found that Stoneley slownesses have frequency dependent behavior that correlate with formation property changes. Therefore, two or more Stoneley (or other dipole or quadrupole wave) slownesses obtained at different frequencies can be used to provide a convenient indicator of formation alterations, especially near wellbore.

Figure 2:
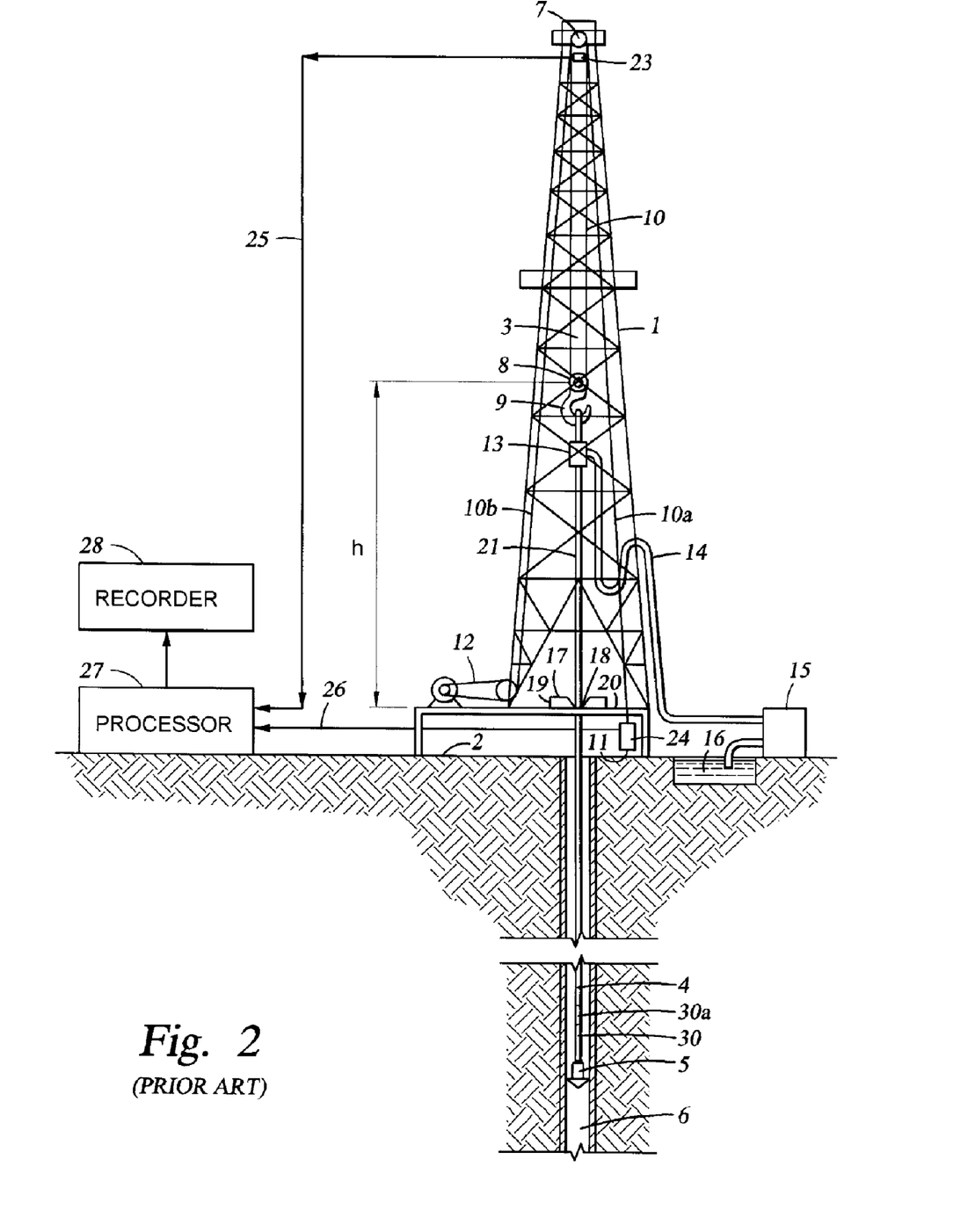
FIG. 2 shows an drilling rig equipped with a drill string with a downhole logging tool in a borehole.

FIG. 2 shows a general illustration of a drilling rig and a drill string with a downhole logging tool in a borehole. The rotary drilling rig shown comprises a mast 1 rising above ground 2 and is fitted with a lifting gear 3. A drill string 4 formed of drill pipes screwed one to another is suspended from the lifting gear 3. The drill string 4 has at its lower end a drill bit 5 for the drilling well 6. Lifting gear 3 consists of crown block 7, the axis of which is fixed to the top of mast 1, vertically traveling block 8, to which is attached hook 9, cable 10 passing round blocks 7 and 8 and forming, from crown block 7, on one hand dead line 10a anchored to fixed point 11 and on the other active line 10b which winds round the drum of winch 12.

Drill string 4 is suspended from hook 9 by means of swivel 13, which is linked by hose 14 to mud pump 15. Pump 15 permits the injection of drilling mud into well 6, via the hollow pipes of drill string 4. The drilling mud may be drawn from mud pit 16, which may be fed with surplus mud from well 6. The drill string 4 may be elevated by turning lifting gear 3 with winch 12. Drill pipe raising and lowering operations require drill string 4 to be temporarily unhooked from lifting gear 3; the former is then supported by blocking it with wedges 17 in conical recess 18 in rotating table 19 that is mounted on platform 20, through which the drill string passes. The lower portion of the drill string 4 may include one or more tools, as shown at 30, for investigating downhole drilling conditions or for investigating the properties of the geological formations. Tool 30 shown is an acoustic logging tool having at least one transmitter and a plurality of receivers spaced therefrom.

Variations in height h of traveling block 8 during drill string raising operations are measured by means of sensor 23 which may be an angle of rotation sensor coupled to the faster pulley of crown block 7. Weight applied to hook 9 of traveling block 8 may also be measured by means of strain gauge 24 inserted into dead line 10a of cable 10 to measure its tension. Sensors 23 and 24 are connected by lines 25 and 26 to processing unit 27 which processes the measurement signals and which incorporates a clock. Recorder 28 is connected to processing unit 27, which is preferably a computer. In addition, the downhole sonic tool 30 may include a processing unit 30a. The downhole computational processing unit 30a and/or the surface processing unit 27 may be used to perform the processing techniques in accordance with embodiments of the invention.

The downhole tool 30 may be a sonic or acoustic tool for making acoustic measurements. Such tools may include one or more sensors and a source, which could be a monopole source, a dipole source, a quadrupole source, or a higher-order pole source. Any sonic or acoustic tool for formation logging known in the art may be used in accordance with embodiments of the invention. Once the measurements are available, they may be processed to provide the desired information regarding the borehole and/or formation. Any processing method (such as STC) known in the art may be used in accordance with embodiments of the invention.

The slowness-time-coherence (STC) method is typically employed to process the monopole LWD sonic waveform signals for coherent arrivals, including the formation compressional, shear and borehole Stoneley waves. See U.S. Pat. No. 4,594,691 issued to Kimball et al., which is incorporated by reference in its entirety, and Kimball et al., Geophysics, Vol. 49 (1984), pp. 264-28. This method systematically computes the coherence (C) of the signals in time windows which start at a given time (T) and have a given window moveout slowness (S) across the array. The 2D plane C(S,T) is called slowness-time plane (STP). All the coherent arrivals in the waveform will show up in the STP as prominent coherent peaks. The compressional, shear, and Stoneley slownesses ($\Delta Tc$, $\Delta Ts$, and $\Delta Tst$) are derivable from the attributes of these coherent peaks.

For slow formations with shear slowness larger than the mud slowness ($V_s < V_f$), the shear headwaves are not directly measurable. In this case, shear slowness is typically measured indirectly from quadrupole mode waveforms and through dispersive STC processing or inversion techniques. For processing dispersive waveforms, the dispersive slowness-time-coherence (DSTC) method is preferred. Description of this method can be found in U.S. patent application Ser. No. 10/904,035, filed Oct. 20, 2004, and U.S. patent application Ser. No. 11/007,402, filed Dec. 8, 2004 (both assigned to the present assignee and incorporated herein by reference in their entirety). See also C. V. Kimball, Geophysics, Vol. 63, No. 2, March-April, 1998; U.S. Pat. No. 5,278,805 (both assigned to the present assignee and incorporated herein by reference in their entirety).

Embodiments of the invention provide methods for monitoring or detecting near-wellbore alterations by measuring characteristics of the Stoneley mode (or other dipole, quadrupole, or higher-order pole modes). While embodiments of the invention are not limited to Stoneley mode, for clarity of description, the following description will primarily use Stoneley mode to illustrate methods of the invention. However, one of ordinary skill in the art would appreciate that embodiments of the invention may also apply to, for example, dipole, quadrupole, octopole, or higher-order borehole modes. The measurements for Stoneley mode analysis, for example, could be acquired with a monopole source while drilling or with a wireline tool. In while drilling applications, the delivery of this alteration information in real time (e.g., via mud telemetry) to the driller is of paramount importance because the alteration information may help the driller to change his drilling practice and thereby avoid potential borehole failures. In wireline applications, embodiments of the invention can also used to provide time lag information for borehole mechanics and completion decisions.

When a borehole is drilled through formations, the drilling action and the mud used during drilling may alter the formation properties around the borehole. Plastic yielding or mechanical damage of the rock may cause near-wellbore softening, which manifests itself as an increase in the Stoneley slowness ($1/V_{st}$) relative to that of the far-field virgin state. In contrast, stress concentrations or overbalance drilling would cause near-wellbore stiffening, which manifests itself as a decrease in the Stoneley slowness relative to that of the far-field virgin state. Thus, Stoneley wave measurements can provide convenient indicators for near wellbore property changes.

However, Stoneley dispersion in a homogeneous isotropic formation is also affected by many borehole/formation parameters, such as borehole diameter, the mud compressional slowness ($1/V_f$), mud density, the formation virgin compressional ($V_p$) and shear slownesses ($V_s$), and formation density. If the drilling process creates an annulus of near-wellbore alterations in the formation, the Stoneley dispersion curve will change relative to that of the virgin formation. To detect the near-wellbore alterations in real-time while drilling, it is preferred to use a technique that is largely independent of the borehole/formation parameters because these parameters may not be available in the downhole environment. In addition, for real-time application, such techniques preferably use a processing algorithm that is relatively less computationally demanding such that a small downhole processor can handle the job within a reasonable time period.

Embodiments of the invention provide convenient methods for monitoring or detecting near wellbore property changes without interference from changes in the borehole-formation parameters. Methods in accordance with embodiments of the invention are based on measurements at two different frequencies for each location (measurement depth, which is the distance from the well head). Measurements at two different frequencies may be obtained from two separate measurements, or from a measurement data set that contains multiple frequency components by band-pass filtering.

For example, a method according to one embodiment of the invention may include: (1) filtering the Stoneley waveforms with a low-band-pass filter and a high-band-pass filter; (2) processing the filtered signals with a proper algorithm (such as the STC algorithm) to obtain the Stoneley slowness $1/V_{st}$ for the lower-band-pass filtered signals and the highband-pass filtered signals. These Stoneley slowness values may also be presented as sonic logs as a function of measurement depth z; and (3) deriving the difference between the Stoneley slownesses in the high and low frequency bands for that location or as a function of measurement depth. A change in the Stoneley slowness difference is an excellent indicator of near-wellbore alteration at that depth. Note that the high-frequency signals and the low-frequency signals may also be obtained from separate measurements, rather than from band-pass filtering.

Methods of the invention have been validated by modeling and by field testing. In field testing, a method in accordance with one embodiment of the invention correctly predicts many zones, where the driller reported having problems, such as restrictive holes needing reaming, stick and slip problems, and wireline sticking. The Stoneley slowness difference is shown to vary sensitively, responding to changes in the magnitudes of near-wellbore alterations (e.g., percent alteration and altered layer thickness).

Figure 3:
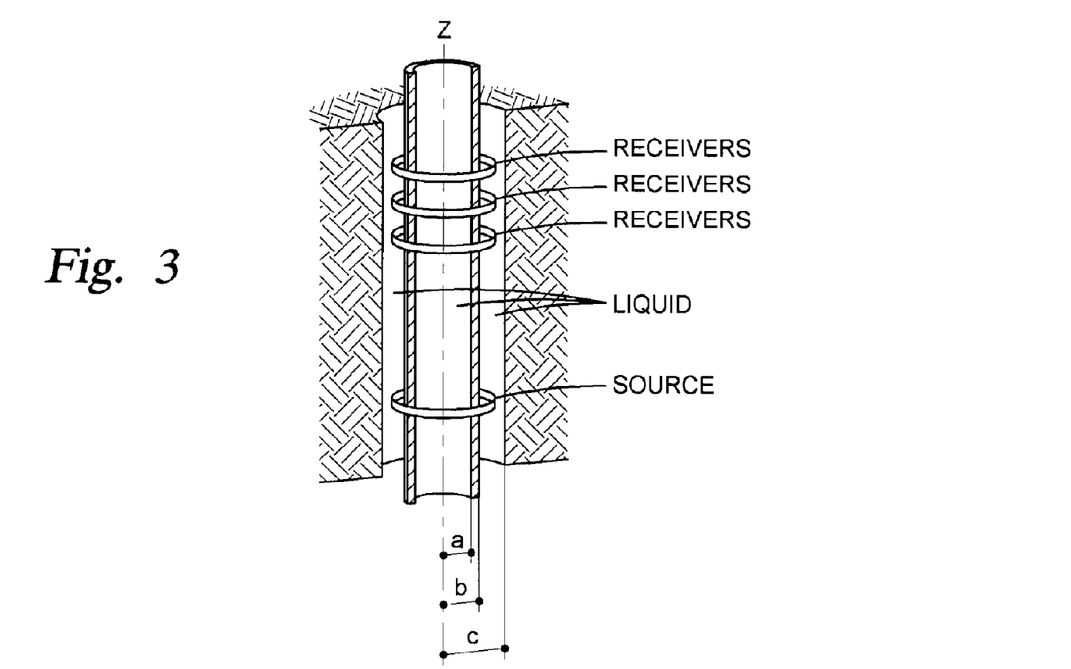
FIG. 3 shows a cross section of simple sleeve sonic tool in a borehole.

FIG. 3 shows a model having a sonic tool disposed on a drill collar concentrically placed in a fluid-filled borehole of radius "c." The sonic tool has a source and three receivers. This model may be used to simulate the effects of a given sonic tool structure on the measured Stoneley dispersion. Note that the inner and outer diameters (shown as "a" and "b") of the drill collar may be adjusted to account for the details of the sonic tool.

Figure 4:
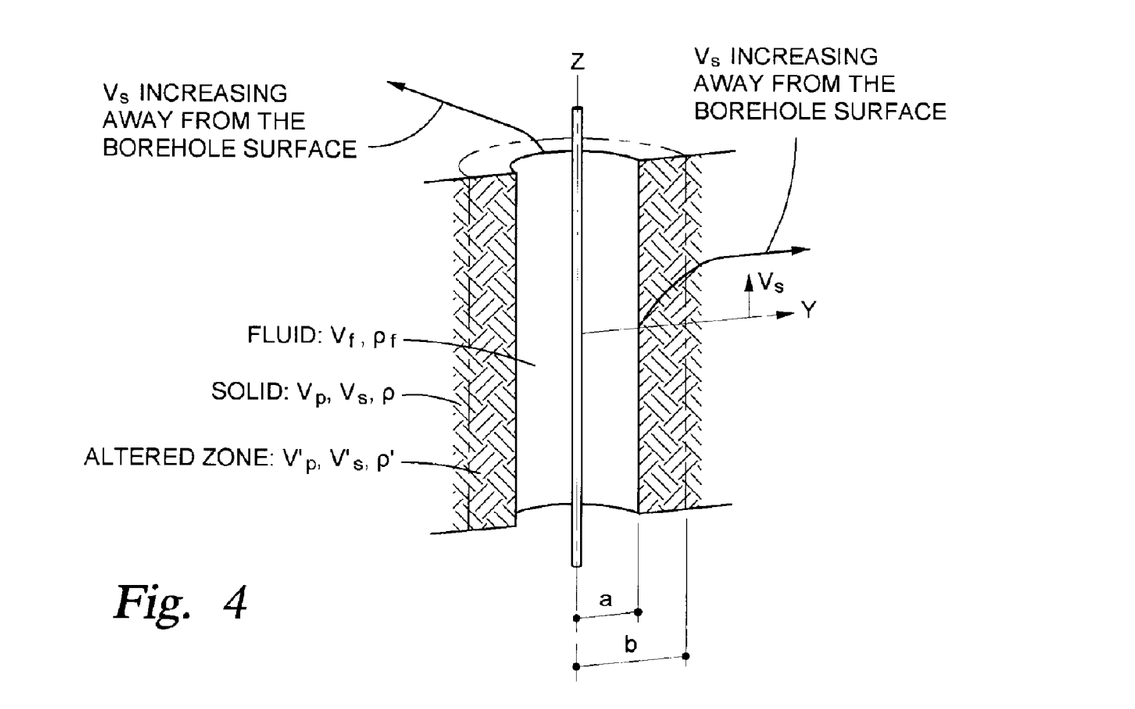
FIG. 4 shows a formation model with a zone of alteration in the surrounding formation.

FIG. 4 shows a formation model having an altered annulus of formation that has a thickness (b-a) surrounding a borehole of radius "a." The altered annulus of formation having properties of: $V_p'$, $V_s'$, and $\rho'$, while the far region of virgin formation has properties of: $V_p$, $V_s$, and $\rho$. The borehole is filled with a drilling fluid having the properties: $V_f$ and $\rho_f$.

Overlaid on the formation model is a plot of shear velocity ($V_s$) as a function of radial depth (r). In this particular model, the $V_s$ increases as a function of radial depth (r) until it reaches the value in the virgin formation. This suggests that the near wellbore region is "softer" than the virgin formation. Although FIG. 4 shows a model of decreasing compressional and shear slownesses away from the borehole surface, it is noted that methods of the invention are also applicable to cases of increasing compressional and shear slownesses caused by near-wellbore stiffening that might be caused by overbalance drilling and/or stress concentrations.

Figure 5:
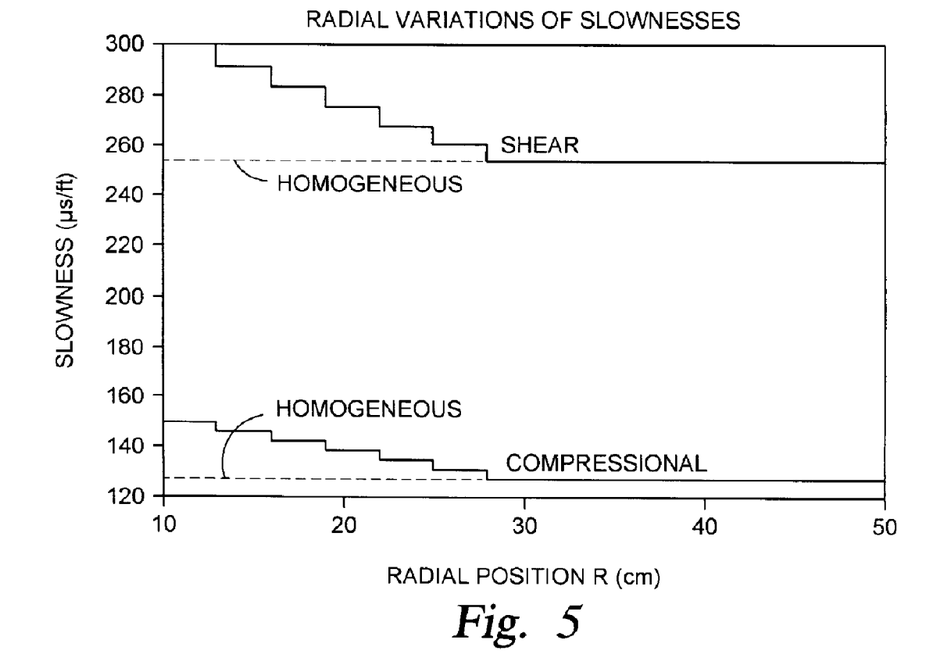
FIG. 5 shows a plot of shear and compressional slownesses versus radial position in a model with near-wellbore alterations.

The step slowness profile in FIG. 5 mimics a linear change in slowness. In reality, the near-wellbore slowness profile may assume a more complicated shape (e.g., exponential profile or otherwise) than the linear variation. In real-time application, it is often advantages to represent the complicated formation by a simplified equivalent so that the necessary information may be extracted within a short period of time. For example, if one is only interested in relative changes in the near wellbore region as compared to the virgin formation, it would be sufficient to use a 2-layer model: a near-wellbore altered layer of given thickness and virgin formation beyond, without regard to the actual change profiles (e.g., linear, exponential, or otherwise).

FIG. 6 shows results from modeling of Stoneley dispersion curves for a sonic tool in a borehole through a typical fast formation. The borehole/formation parameters used in the modeling are:

Virgin rock properties: compressional slowness, $\Delta Tc$ ($1/V_p$)=80 μs/f, shear slowness, $\Delta Ts$ ($1/V_s$)=160 μs/f, formation density ($\rho_b$)=2.4 g/cc Borehole & fluid properties: hole diameter (HD)=8.5 in., mud slowness, $\Delta Tm$ ($1/V_f$)=200 μs/f, mud density ($\rho_m$)=1.1 g/cc Alteration magnitude: 13, 25, 40% increase in both $\Delta Tc$ and $\Delta Ts$, representing three cases of different degrees of alterations.

Altered layer thickness: 1, 2, 3, and 6-in [2.5, 5, 7.6, and 15-cm] altered layers, representing four cases of altered layer profiles with increasing thickness.

Figure 6A:
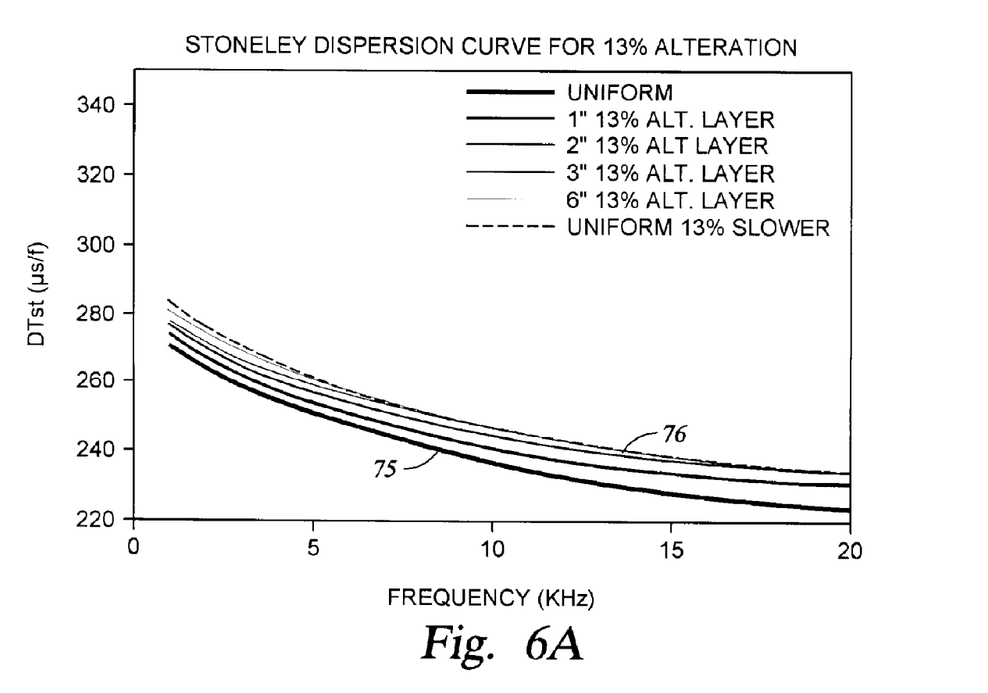
FIGS. 6A-6F show results from modeling studies for a fast formation, illustrating Stoneley Dispersion Curves with varied alteration in the formation and Stoneley Formation Damage (SFD) versus the thickness of the altered layer.
Figure 6B:
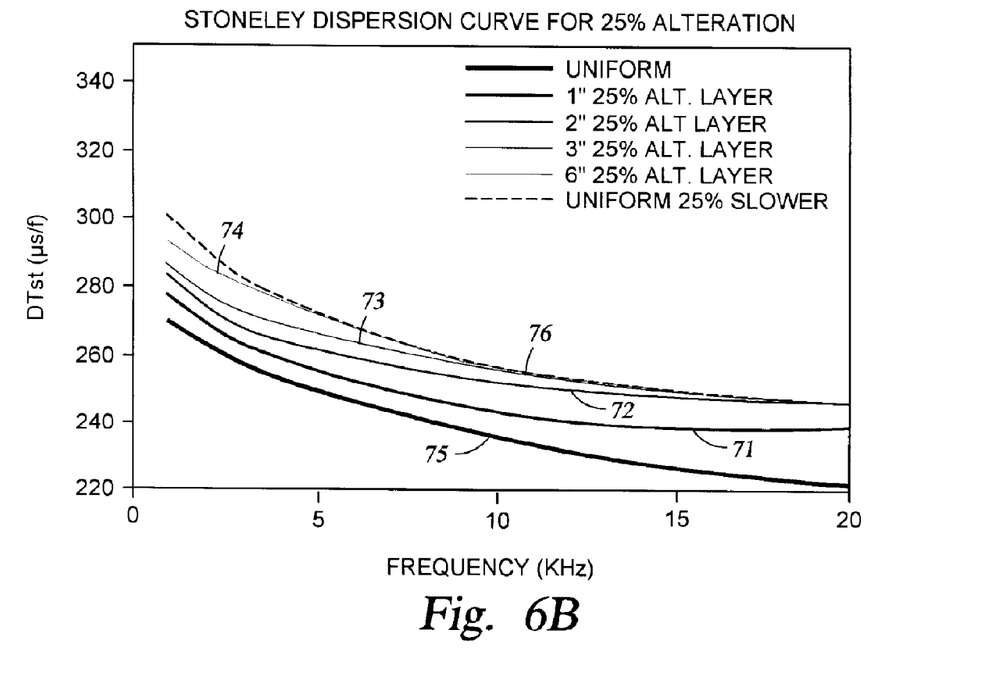
Figure 6C:
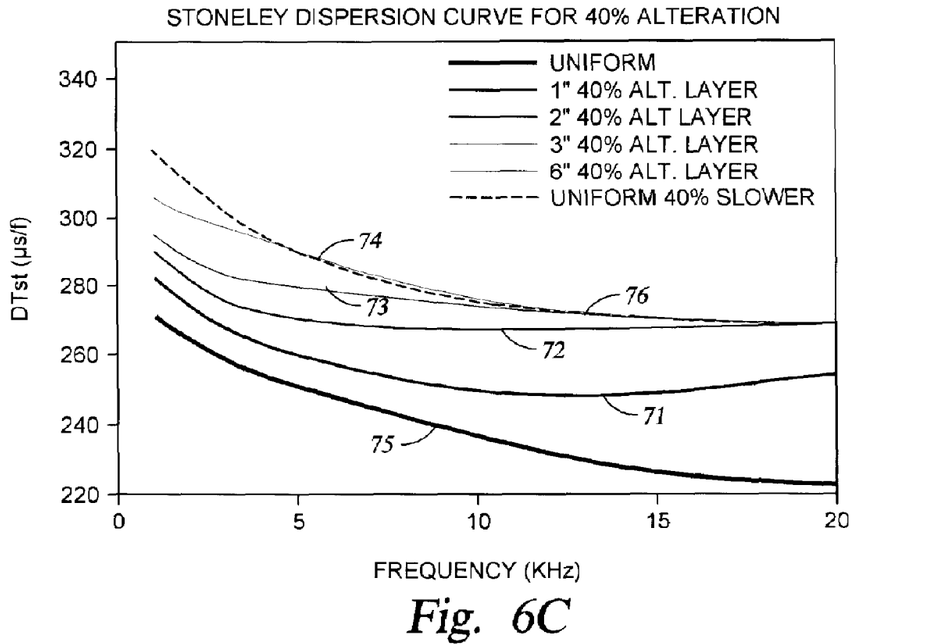

The dispersion curves are plotted in three groups according to the alteration magnitudes (FIGS. 6A, 6B, and 6C for 13%, 25% and 40% alterations, respectively). Each curve is plotted as a function of frequency up to 20 kHz. For each group, the dispersion curves (71-74) for different alteration layer thickness (1, 2, 3, and 6-in [2.5, 5, 7.6, and 15-cm] respectively) are plotted together with the dispersion curves for the original uniform formation (curve 75) and the slower uniform formation (curve 76).

It was observed that as the altered layer thickness increases, the Stoneley dispersion curves (from curve 71 to curve 74) move away from the original uniform formation dispersion curve (curve 75) toward that of the slower uniform formation (curve 76) in an orderly fashion. In addition, the higher frequency portions (right hand half in each panel) of the dispersion curves move faster towards the slow formation (curve 76) than do the lower frequency portions (left hand half in each panel). This is due to the fact that at a higher frequency the wavelength is shorter, and the wave with shorter wavelength "feels" the full effect of the thin altered layer quicker.

Using the 25% alteration (FIG. 6B) case as an example, the Stoneley dispersion curve of the 2.5-cm altered layer (curve 71) at 5 and 20 kHz has a value of 256 and 240 μs/f, respectively. The wavelengths at these two frequencies are 25.4 cm and 6.3 cm, respectively. The 2.5-cm layer thickness is about 40% of a wavelength at 20 kHz, and is about 10% of a wavelength at 5 kHz. Consequently, the 2.5-cm layer thickness dispersion curve (curve 71) moves more than half way toward the slower uniform formation dispersion curve at 20 kHz, and moves only about 20% at 5 kHz.

At 20 kHz, dispersion curves of the 2, 3 and 6-in [5, 7.6 and 15-cm] layer thickness cases (i.e., curves 72, 73, and 74) all have approximately the same value as that of the slower uniform formation (curve 76). This suggests that the wavelength at 20 kHz is sufficiently short, as compared with the layer thickness, for the wave to "feel" the full effect of an altered layer of 5 centimeters thickness or more. Further increase in the layer thickness (beyond the wavelength) will not change the slowness of the wave. Therefore, curves 72, 73, and 74 all merge at the slow formation slowness (curve 76).

On the other hand, at 5 kHz, the dispersion curves of the 1, 2, 3 and 6-in [2.5, 5, 7.6 and 15-cm] layer thickness cases (curves 71, 72, 73, and 74) distribute substantially evenly between the two uniform formation dispersion curves (curves 75 and 76). This implies that the wavelength at 5 kHz is relatively long, as compared with the layer thickness of most cases, such that the wave does not "feel" the full effect of the altered layer except the 6-in [15-cm] layer (curve 74), which approaches that of the slower uniform formation.

The above results suggest that when the thickness of an altered layer reaches about half a wavelength, the Stoneley dispersion curve is most sensitive to the altered layer properties. Further increase in the layer thickness beyond the half wavelength likely saturates the response of the Stoneley dispersion curve. Therefore, to detect the thickness of the thick altered layer, one should do it at a lower frequency range where the half wavelength is larger than the layer thickness.

These modeling results also suggest simple alteration indicators may be derived by comparing Stoneley responses of high-frequency components with those of low-frequency components. In this description, one such indicators is referred to as a Stoneley Formation Damage (SFD) indicator, which is suitable for real-time applications. The SFD indicator is defined as the difference in Stoneley slownesses measured at two different frequency bands. The SFD indicator is very easy to implement in the downhole environment. It will capture the essence of the variation of the Stoneley dispersion curve due to alteration, namely faster shift toward the altered state in higher frequency than lower frequency. Because the SFD indicator is a differential measurement, it is relatively immune to variations of borehole/formation parameters, such as the mud compressional slowness and its mass density, and the effect of tool structure.

Figure 6D:
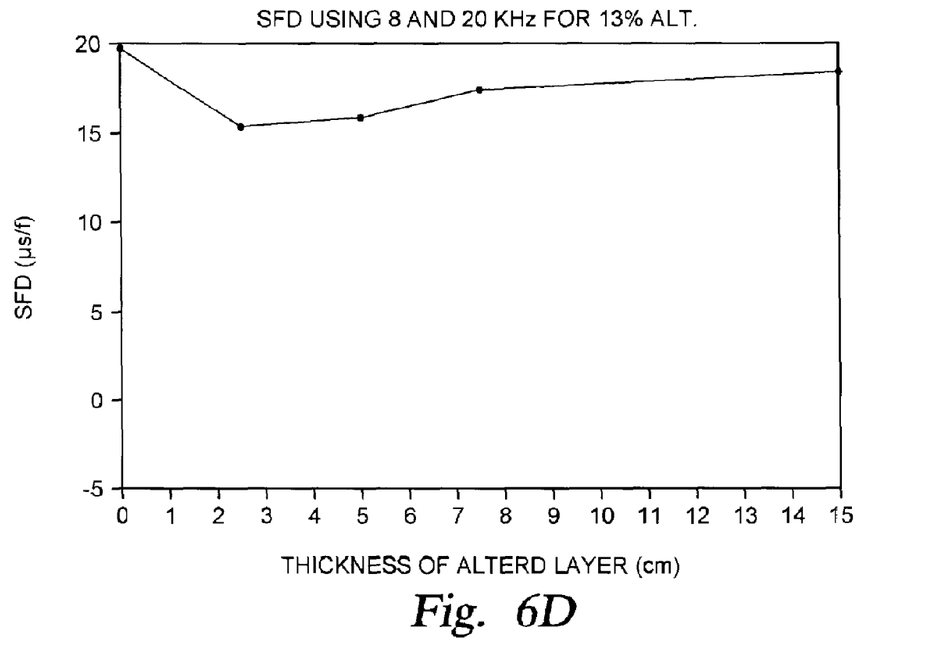
Figure 6E:
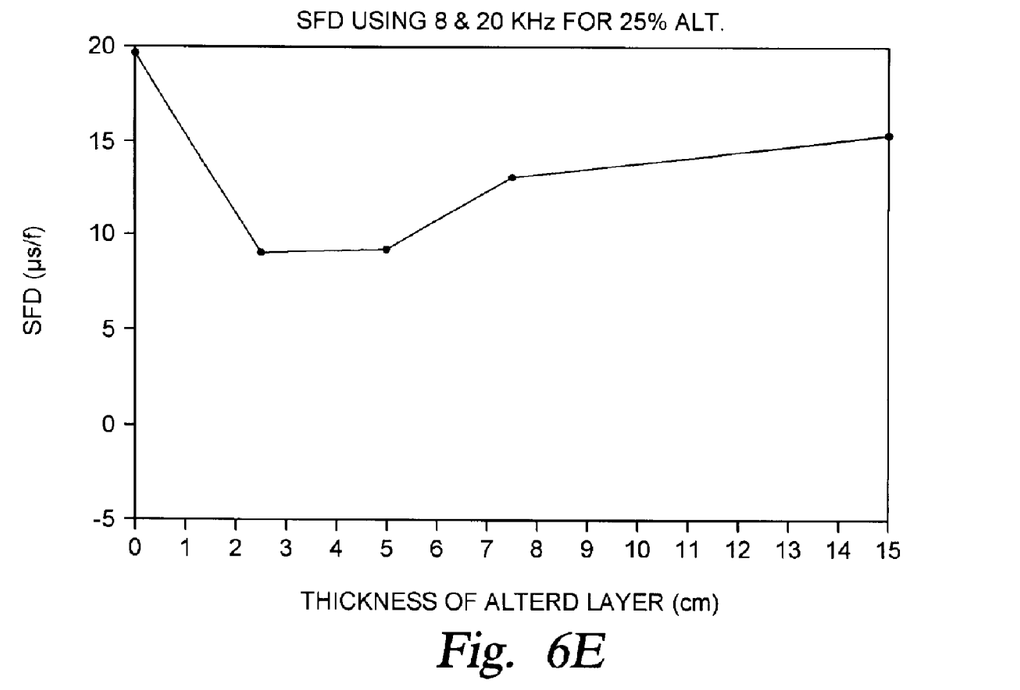
Figure 6F:
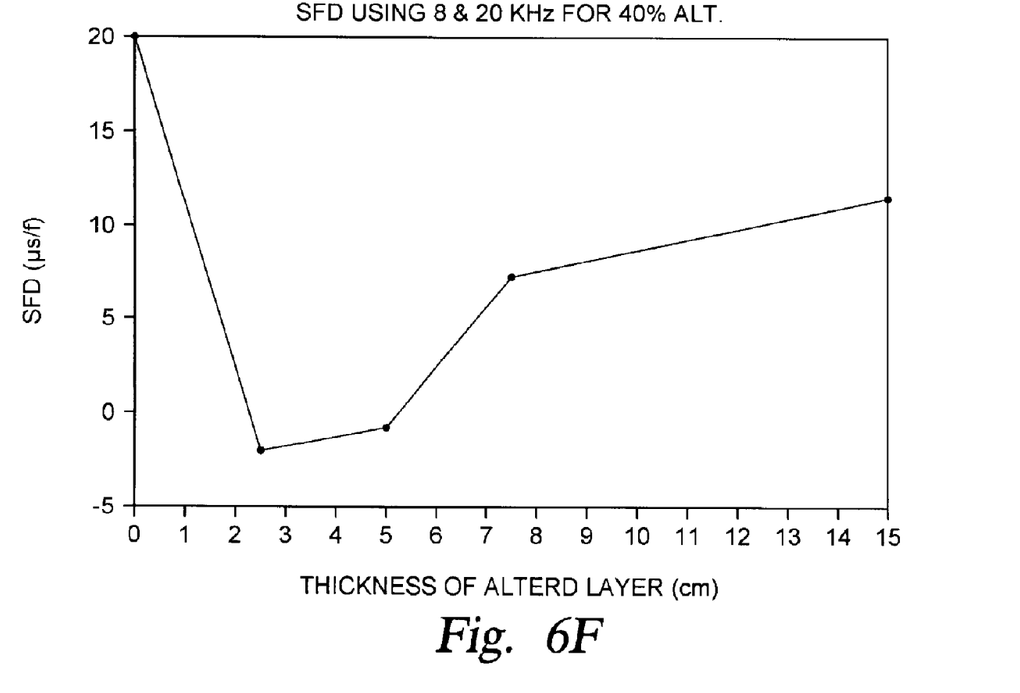

FIG. 6D, 6E, and 6F show the SFD indicators using 8 and 20 kHz measurements for the three cases of alteration magnitudes (13%, 25%, and 40%, respectively). The existence of an altered layer causes the SFD indicator to shift to a lower value as compared to the unaltered virgin formation (altered layer thickness=0). The SFD indicator in FIGS. 6D-6F shows a drop of 5, 11, and 22 µs/f responding to magnitude of alteration of 13, 25, and 40%, respectively. This characteristic of orderly increase in the values of SFD indicator to the increase of magnitude of alteration will make the SFD indicator a very nice qualitative indicator of alteration. The indication of alteration is not based on absolute values of the SFD indicator, which tend to change as the borehole/formation parameters vary. Rather, alteration is indicated if the value of the SFD indicator drops significantly with respect to its mean value in a zone of similar formation. Therefore, the interpretation of alteration may be done by reviewing the SFD indicator together with other logs such as gamma ray, deep resistivity, deep sonic measurement of ΔTc, ΔTs, etc. These other logs may be used to help establish a local mean trend line for the SFD indicator.

Figure 7A:
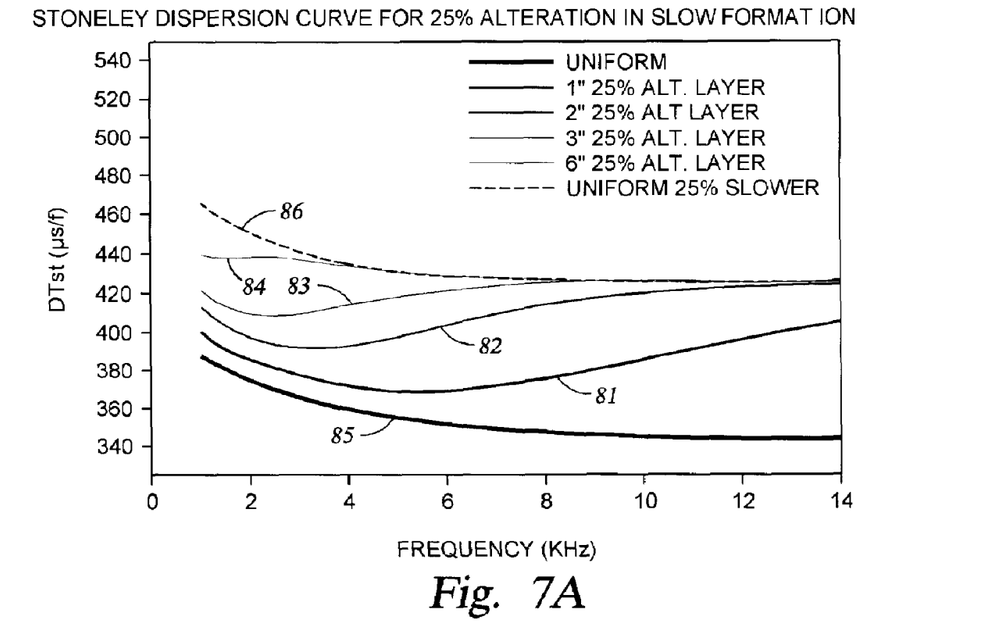
FIGS. 7A-7B show results from modeling studies for a slow formation, illustrating Stoneley Dispersion Curves and Stoneley Formation Damage (SFD) with varied thickness of alteration layers in the formation.

The above modeling was performed with a fast formation. A useful method should be applicable to all types of formations. Therefore, the modeling study was also performed with a slow formation. Shown in FIG. 7A are results from a model study, illustrating Stoneley dispersion curves 81-86 for a sonic tool in a borehole through a typical slow formation. The borehole/formation parameters used in the modeling are:

Slow formation virgin rock properties: compressional slowness, ΔTc=120 µs/f, shear slowness, ΔTs=300 µs/f, density ($\rho_b$)=2.3 g/cc.

Borehole & fluid properties: hole diameter (HD)=8.5 in., mud slowness, ΔTm=200 µs/f, mud density ($\rho_m$)=1.1 g/cc.

Alteration magnitude: 25% increase on both ΔTc and ΔTs.

Altered layer thickness: 1, 2, 3, and 6-in [2.5, 5, 7.6, and 15-cm], representing four cases of one-layer profile with increasing thickness.

The dispersion curves 81-84 for different alteration layer thickness (1, 2, 3, and 6-in, [2.5, 5, 7.6, and 15-cm] respectively) are plotted together with the dispersion curves for the original uniform formation (curve 85) and the slower uniform formation (curve 86).

Figure 7B:
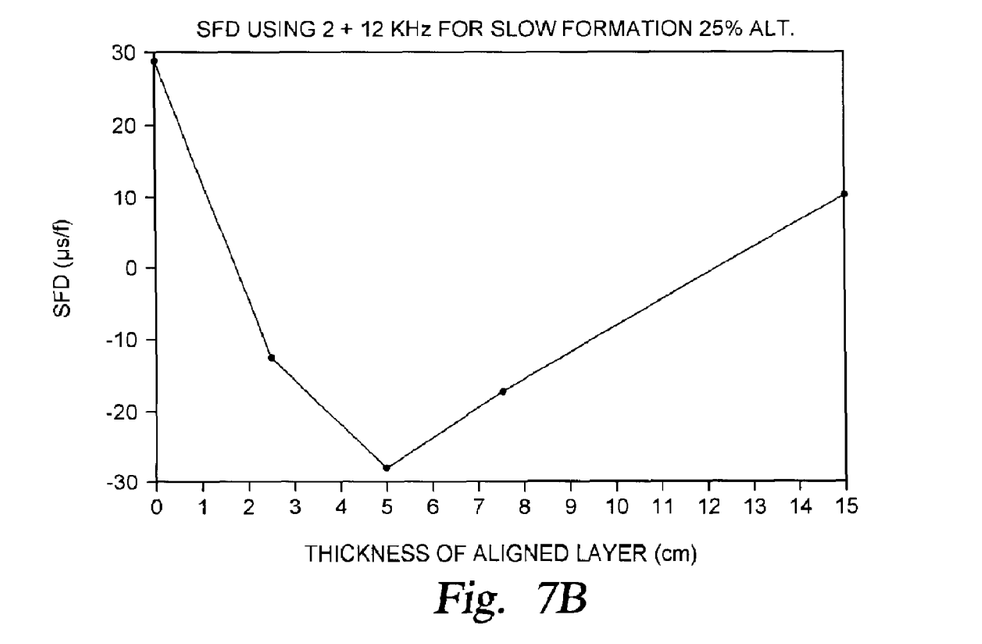

A similar trend was observed for the variation of dispersion curve responding to the alteration as for the fast formation cases (see FIG. 6). For the slower formation, the frequency at which the half wavelength is comparable to the layer thickness will be lower compared with the fast formation cases. The lower plot of FIG. 7B shows a SFD indicator using lower frequencies. Although the alteration magnitude is 25% in this slow formation, the difference between the virgin and altered formation slownesses is much bigger, as compared with that for the fast formation 25% alteration case. Consequently, the SFD indicator has an even bigger response to the altered layer, as compared with the fast formation 25% alteration case. A 2.5-cm thick altered layer could reduce the SFD indicator from the values for the virgin state by as much as 42 ms/f.

Results from the modeling studies indicate that SFD indicators in accordance with embodiments of the invention may be used to detect alterations in all types of formation, including fast and slow formations (Norris, A. N., and Sinha, B. K., "Weak elastic anisotropy and the tube wave", Geophysics, vol. 58, No. 8, pp. 1091-1098, August 1993). A method in accordance with embodiments of the invention for detecting mechanical alteration caused by radial variations of horizontal shear slownesses or equivalently, the horizontal shear modulus $C_{66}$ around a vertical borehole, for example, may include the following steps:

(i) Estimate the Stoneley slowness at low frequency, S_stoneley_low_freq. One robust way to achieve this is to use, for example, an STC algorithm on the low-band-pass filtered monopole waveforms.

(ii) Estimate the Stoneley slowness at high frequency, S_stoneley_high_freq. One robust way to achieve this is to use, for example, an STC algorithm on the high-band-pass filtered monopole waveforms.

(iii) Construct the SFD indicator as the differences in the Stoneley slownesses between the low- and high-band-pass filtered waveforms, i.e.

SFD=S_stoneley_low_freq−S_stoneley_high_freq.

(iv) Increase or decrease in the SFD from the value at a reference depth characterized by a radially homogeneous formation is an indication of near-wellbore alteration. Other logs, such as GR, deep resistivity, deep sonic measurement of ΔTc, ΔTs, etc, may be used to establish this reference depth.

In deviated boreholes, the Stoneley data provides radial variations in the effective shear modulus $C_{66}$ in the borehole cross-sectional plane.

In real-time applications, it may be advantageous to show the near-wellbore alteration through the Stoneley slownesses at two frequency bands because for computational efficiency considerations. However, the detection of the near-wellbore alteration techniques disclosed herein are not to be limited to a two-frequency process. For example, comparing the measured Stoneley dispersion curve with a reference Stoneley dispersion curve, computed assuming a homogeneous formation model using far field measured formation parameters, could also provide indication of near-wellbore alteration (Sinha, B. K., Kostek, S., and Norris, A. N., "Stoneley and flexural modes in pressurized boreholes", Journal of Geophysical Research, vol. 100, No. B11, pp. 22,375-22,381, Nov. 10, 1995). Therefore, embodiments of the invention are not limited to two frequencies.

Even though embodiments of the invention are described herein for the detection of near-wellbore alteration in real-time using Stoneley waves, which is one of the strongest signals in the recorded monopole waveforms, it will be understood by those skilled in the art that the disclosed techniques are entirely applicable using other borehole modes, such as borehole flexural and quadrupole modes. All these borehole model dispersion curves are perturbed by varying degrees similar to the case of Stoneley waves in the presence of near-wellbore alteration.

Figure 8A:
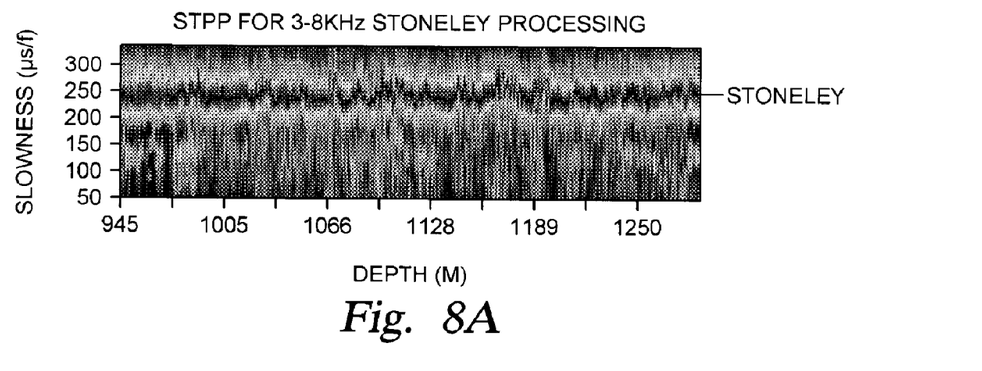
FIG. 8 shows actual Stoneley, shear, and compressional data collected downhole at low frequency (3-8 kHz) and at high frequency (8-13 kHz), and the SFD analysis of the data in accordance with one embodiment of the invention.
Figure 8B:
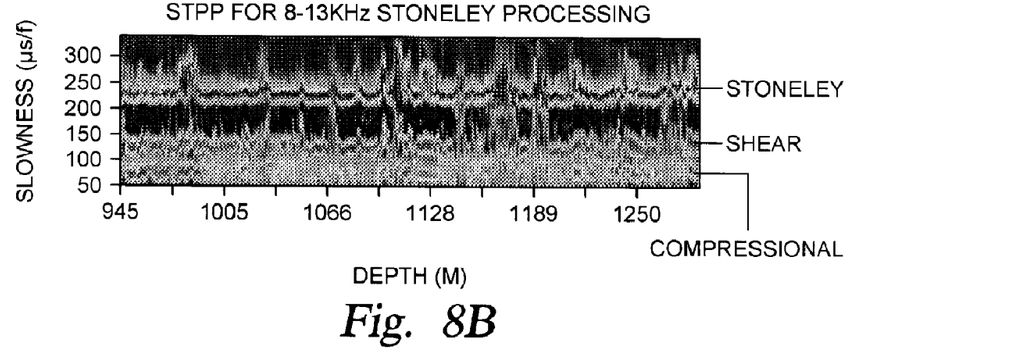
Figure 8C:
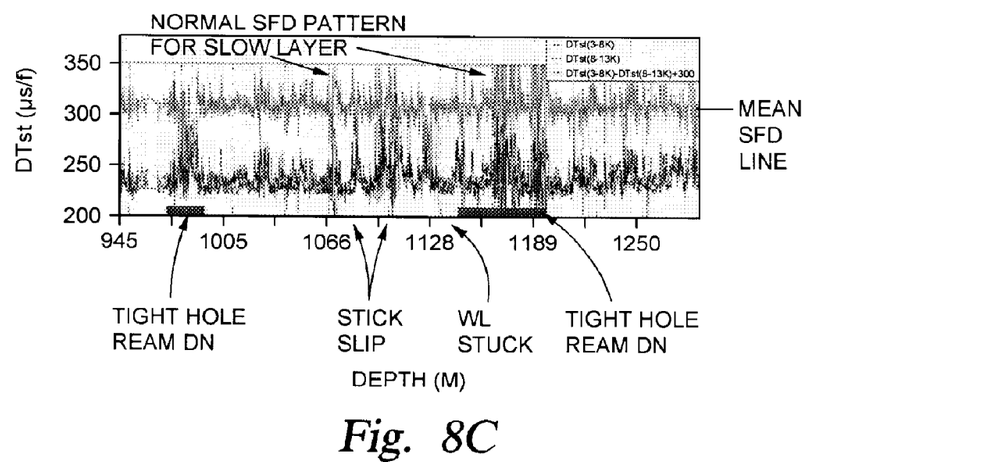

FIGS. 8A-8C shows an example of a real world application of SFD derived from monopole waveforms acquired during drilling with a downhole acoustic tool. FIG. 8A and FIG. 8B are the slowness-time plane projection (STPP) of the STC processing of the monopole waveforms with low band pass filter (3-8 kHz) and high band pass filter (8-13 kHz), respectively. The low band pass filtered STPP (FIG. 8A) shows only one high coherent peak due to Stoneley around 250 µs/f. The slowness of this arrival is the low frequency Stoneley slowness log. With the high band pass filter of 8-13 kHz, the STPP (FIG. 8B) shows three prominent coherent peaks. The top one around 230 μs/f is due to Stoneley wave and the lower two are due to shear and compressional waves. The slowness of the high frequency Stoneley wave is plotted as black curve in FIG. 8B. FIG. 8C shows the high and low frequency Stoneley slowness logs together with the SFD, which is shifted by 300 μs/f for plotting convenience.

Based on information from other logs including gamma ray and resistivity (not shown), ΔTc and ΔTs, it was known that the formations traversed by this log were mostly fast limestone with occasional shale layers. The properties of the multiple layers of limestone are quite similar. One can easily establish a mean line for SFD as shown in FIG. 8C. There are several zones where the SDF move prominently downward from the mean line. Cross checking with the driller's log shows that these zones correlate excellently with the drilling problem zones where the near wellbore softening causes drilling and logging problems. For example, over the zones marked near 975 and 1143-1188 m where there are significant SFD downward shift from the mean, the driller experienced hole problems. Near 1066 and 1097 m, the driller experienced a stick-slip problem. Near 1097 m, the tool got stuck due to a hole problem.

These field examples demonstrate the robustness and value of the SFD indicator, which can flag the near wellbore softening zones as potential drilling problem areas. Delivery of this information in real-time will help the driller to take action, such as changing mud weight, changing drilling speed, etc., to prevent the incipient problem from developing into a full-blown drilling disaster. Advantages of embodiments of the present invention include the ability to detect near-wellbore alterations with high axial resolution, particularly in the drilling environment.

Figure 9:
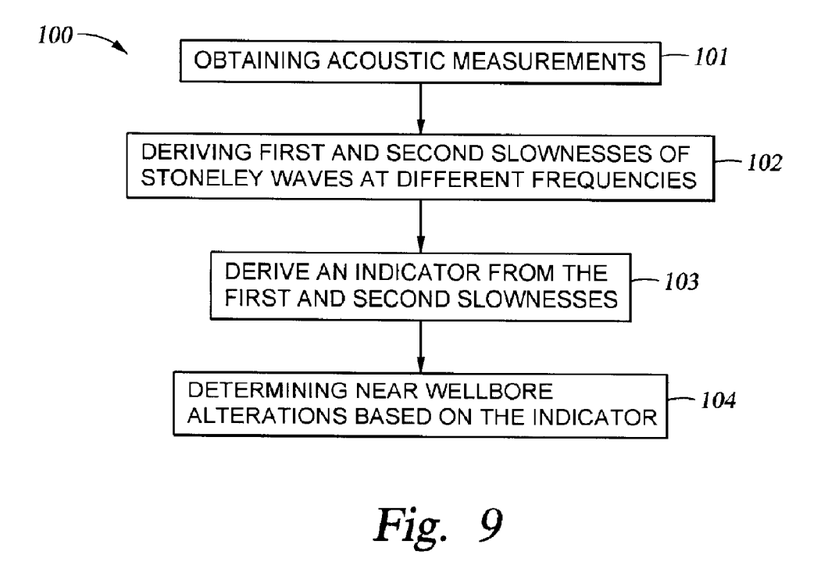
FIG. 9 shows a flow chart illustrating a method in accordance with one embodiment of the invention.

FIG. 9 shows a flow chart illustrating a method in accordance with one embodiment of the invention. As shown in FIG. 9, a method 100 may comprise obtaining acoustic measurements (step 101). Such acoustic measurements may be from previous logging operations and/or performed with while-drilling or wireline operations. Next, a first slowness and a second slowness of Stoneley waves (or other waves in dipole or quadruple modes) at two different frequencies are determined from such measurements (step 102). These determination may be based on a single measurement data set that includes a plurality of frequency components by using band pass filtering. Alternatively, the different frequency components may be from separate measurements.

Deriving slowness from acoustic measurements may be performed with any method known in the art, such as the slowness-time-coherence (STC) or dispersive STC method. The first and second slownesses are then used to derive an indicator that can be used to monitor a near well bore formation property (step 103). Such indicators may be derived for every measurement depth to provide a log showing formation property changes along the measurement depths. Furthermore, such indicators may be used to determine near wellbore alterations by comparing the indicators to a reference value (step 104), which may be derived from an average property of the formation based on other measurements.

Figure 10:
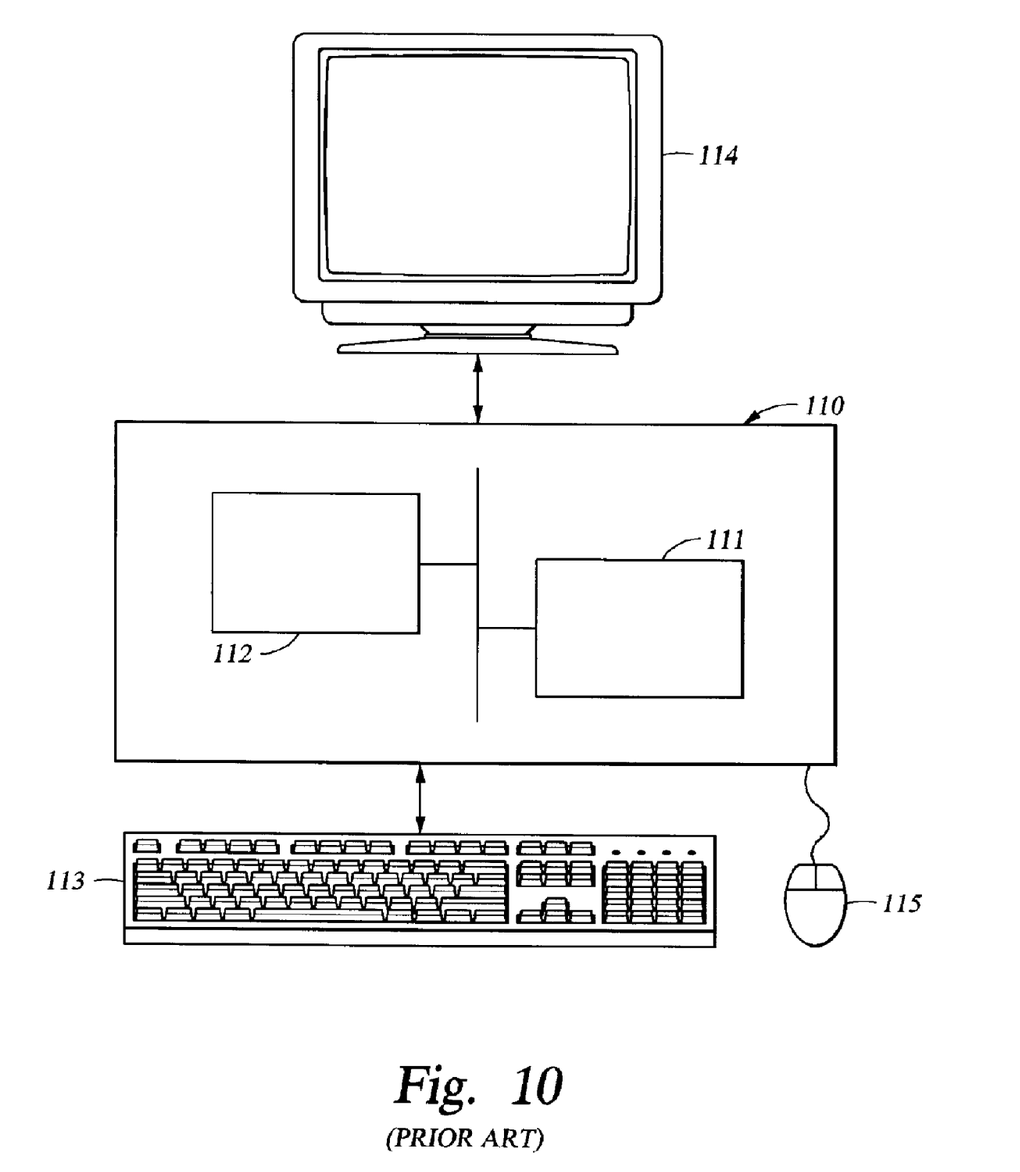
FIG. 10 shows a conventional computer system that may be used with embodiments of the invention.

Embodiments of the invention may be implemented with computational units including processors and electronics in a downhole tool or on a surface processor as known in the art. FIG. 10 shows a general purpose computer 110 that may be used with embodiments of the invention. The computer 110 has a processor 111 and one or more memories 112 that may be used to store a program having instructions for performing a method of the invention. The computer may have a display 114 and one or more input devices, such as a keyboard 113 and a mouse 115. Some embodiments may include removable storage means, such as a floppy disk, a CD ROM or other optical disk, a magnetic tape, a read-only memory chip (ROM), and other forms of the kind known in the art or subsequently developed. The program of instructions may be in object code or source codes. The precise forms of the program storage device and of the encoding of instructions are immaterial here.

While the invention has been described with respect to a limited number of embodiments, those skilled in the art will appreciate that other embodiments can be devised which do not depart from the scope of the invention as disclosed herein. For example, embodiments of the invention may be implemented over a broad frequency range of acoustic modes, including wave modes propagating as monopole, dipole, quadrupole, and higher-order modes. Additionally, while the invention has been described primarily with respect to while-drilling systems, those skilled in the art will appreciate that the disclosed techniques may also be implemented in wireline, reservoir monitoring, coiled tubing, cross-well, while-tripping, or other oilfield applications.

What is claimed is:

1. A method for monitoring a near wellbore formation property using acoustic waveforms, comprising:
    filtering the acoustic waveforms with a first bandpass filter to obtain first signals;
    filtering the acoustic waveforms with a second, different bandpass filter to obtain second signals;
    processing the first and second signals to obtain first and second slowness values each characterizing an acoustic wave having a different frequency;
    making a comparison between the first and second slowness values at a reference depth;
    detecting a near wellbore alteration based on the comparison; and
    outputting the results of the detecting to a user.

2. The method of claim 1, wherein the first filter comprises a low-band-pass filter and the second filter comprises a high-band-pass filter.

3. The method of claim 1, wherein the acoustic waveforms are from Stoneley mode.

4. The method of claim 1, wherein the acoustic waveforms are from a monopole, dipole, quadrupole, or higher-order-pole mode.

5. The method of claim 1, wherein the comparison comprises deriving an indicator based on a difference between the first and second slowness values.

6. The method of claim 5, wherein the indicator is a change in the difference between the first and second slowness values as a function of measured depth.

7. The method of claim 1, wherein processing the first and second signals uses a slowness-time-coherence (STC) algorithm.

8. The method of claim 1, wherein the acoustic waveforms are obtained from while-drilling togging measurements.

9. The method of claim 1, wherein the acoustic waveforms are obtained from wireline logging measurements.

10. The method of claim 1, wherein the first and second signals are obtained from separate measurements of the waveforms.

11. A system for monitoring a near wellbore formation property using acoustic waveforms, comprising:
    a processor and a memory, wherein the memory stores a program having instructions for:

filtering the acoustic waveforms with a first bandpass filter to obtain first signals;
filtering the acoustic waveforms with a second, different bandpass filter to obtain second signals;
processing the first and second signals to obtain first and second slowness values each characterizing an acoustic wave having a different frequency;
making a comparison between the first and second slowness values at a reference depth;
detecting a near wellbore alteration based on the comparison,
wherein the first and second signals are obtained from separate measurements of the waveforms.

12. The system of claim 11, wherein the first filter comprises a low-band-pass filter, the second filter comprises a high-band-pass filter, and wherein the program has instructions for performing the low-band-pass and high-band-pass filtering.

13. The system of claim 11, wherein the acoustic waveforms are from Stoneley mode.

14. The system of claim 11, wherein the acoustic waveforms are from a monopole, dipole, quadrupole or higher-order-pole mode.

15. The system of claim 11, wherein the comparison comprises deriving an indicator based on a difference between the first and second slowness values.

16. The system of claim 15, wherein the indicator is a change in the difference between the first and second slowness values.

17. The system of claim 11, wherein processing the first and second signals uses a slowness-time-coherence (STC) algorithm.

18. The system of claim 11, wherein the system is part of a downhole tool.

* * * * *